A. C. DARLING, Jr.
COUNTERSINKING DRILL.
APPLICATION FILED OCT. 21, 1911.
1,070,425.
Patented Aug. 19, 1913.
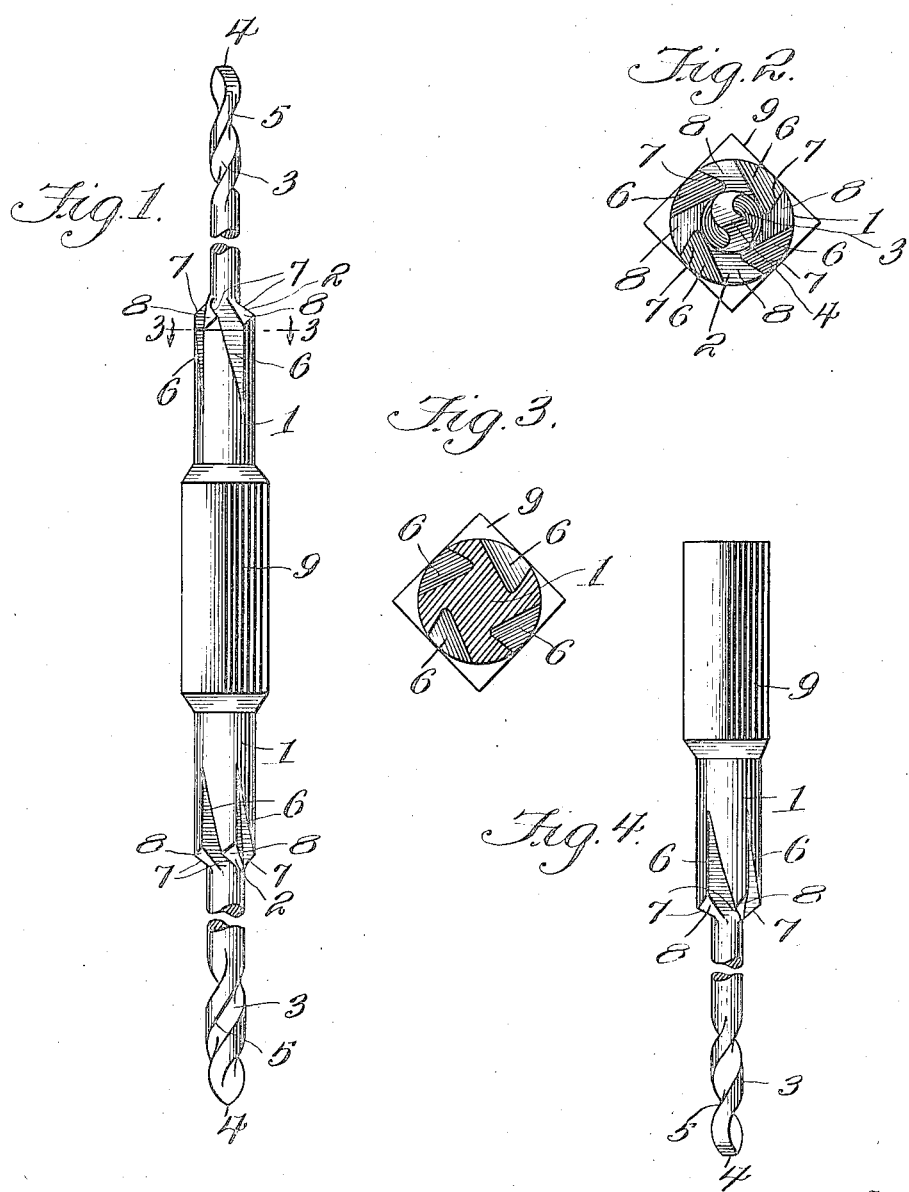
Witnesses
Inventor
Albert C. Darling Jr.
By Victor J. Evans,
Attorney

UNITED STATES PATENT OFFICE.

ALBERT C. DARLING, JR., OF LODI, NEW YORK.

COUNTERSINKING-DRILL.

1,070,425.

Specification of Letters Patent.   Patented Aug. 19, 1913.

Application filed October 21, 1911. Serial No. 655,947.

*To all whom it may concern:*

Be it known that I, ALBERT C. DARLING, Jr., a citizen of the United States, residing at Lodi, in the county of Seneca and State of New York, have invented new and useful Improvements in Countersinking-Drills, of which the following is a specification.

This invention relates to countersinking drills especially designed for forming bolt or rivet holes in the rims and tires of vehicle wheels, the object of the invention being to provide a simple, inexpensive and efficient one-piece drill, whereby alined holes may be simultaneously bored in a tire and rim and the rim hole countersunk in a single continuous operation.

A further object of the invention is to provide a single-piece double drill embodying in one and the same tool drills of different diameters which may be interchangeably employed by simply reversing the tool end for end, thus obviating the necessity of using separate or take-apart tools.

The invention consists of the features of construction, combination and arrangement of parts hereinafter fully described and claimed, reference being had to the accompanying drawing, in which:—

Figure 1 is a side view of a double drill embodying my invention. Fig. 2 is an end view on an enlarged scale looking toward the drill point. Fig. 3 is an enlarged detail section on line 3—3 of Fig. 1. Fig. 4 is a side view of a single drill embodying the invention.

Referring to the drawing, 1 represents the body or shank of the drill, terminating in a tapering outer end 2, from which projects a spiral drill bit 3, which bit is integral with the body or shank, and of relatively smaller diameter than the same. This bit is provided with the usual drill point 4, and spiral cutting edge 5. The body or shank 1 is formed adjacent to its tapered end 2 with an annular series of spiral grooves 6 opening at their outer ends through said tapered end 2, and gradually diminishing in width and depth therefrom. These grooves form clearance channels and the outer ends of the rear walls of the grooves terminate in cutting edges 7 formed by beveled surfaces 8 which beveled surfaces collectively produce the tapering form of the end 2.

In Fig. 1, I have shown a double drill of the character described, the shanks of the drills being arranged in longitudinal alinement and connected at their inner ends by a union 9 of angular form in cross section for engagement with the chuck of a suitable driving tool. The drills and union are formed of a single solid piece of metal in a unitary structure so that by simply reversing the tool end for end either one of the drills may be employed. Preferably the drills are made of different sizes or diameters so that by the use of a single tool, holes of different diameters may be bored or countersunk. This construction secures economy of manufacture as well as convenience of use and operation, as the necessity of employing a take-apart construction or independent tools for the purposes set forth is obviated.

Fig. 4 shows a single drill constructed in accordance with the invention. The drill is especially designed for the purpose of forming the bolt or rivet receiving holes in the rims and tires of vehicle wheels and countersinking the holes in the rims. By means of the bit 3 alining holes in the tire and rim may be simultaneously formed and the hole in the tire countersunk by the action of the countersinking cutter formed by the cutting edges 7 and beveled surfaces 8, as will be readily understood, thus enabling the bolt holes to be produced in a convenient and expeditious manner, and obviating the necessity of forming them separately in the rim and tire.

Having thus fully described the invention what is claimed as new is:

As a new and improved article of manufacture, a countersinking drill comprising a body or shank having a conical outer end, a drill bit having a smooth surfaced portion integral with and of less diameter than the conical end of the shank and projecting from the apex thereof, said shank being provided with an annular series of comparatively long, gently inclined substantially obtuse-angled triangular-shaped spiral grooves opening through the conical end of the shank and gradually increasing in width and depth toward the same, each of said grooves having front and rear relatively long and short beveled side walls respectively inclined at obtuse and oblique angles to the axis of the bit, the said rear or shorter walls of the grooves being undercut and arranged to provide with the beveled surfaces of the conical portion a series of countersinking cutters merging directly into the face of the smooth portion of the drill bit.

In testimony whereof I affix my signature in presence of two witnesses.

ALBERT C. DARLING, JR.

Witnesses:
S. MAUD MYER,
RICHARD P. FARR.